July 21, 1959  C. G. ROPER ET AL  2,895,502
AUTOMATIC PROCESS CONTROL SYSTEM
Filed Oct. 20, 1955  3 Sheets-Sheet 2
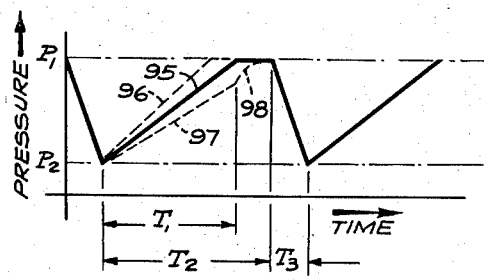
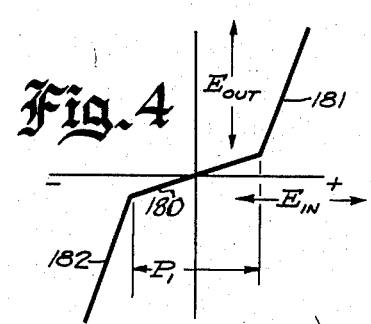
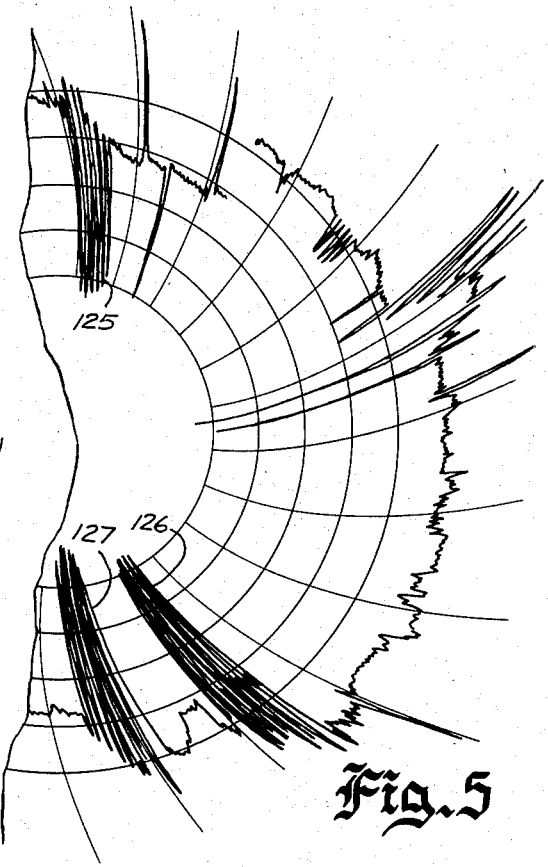
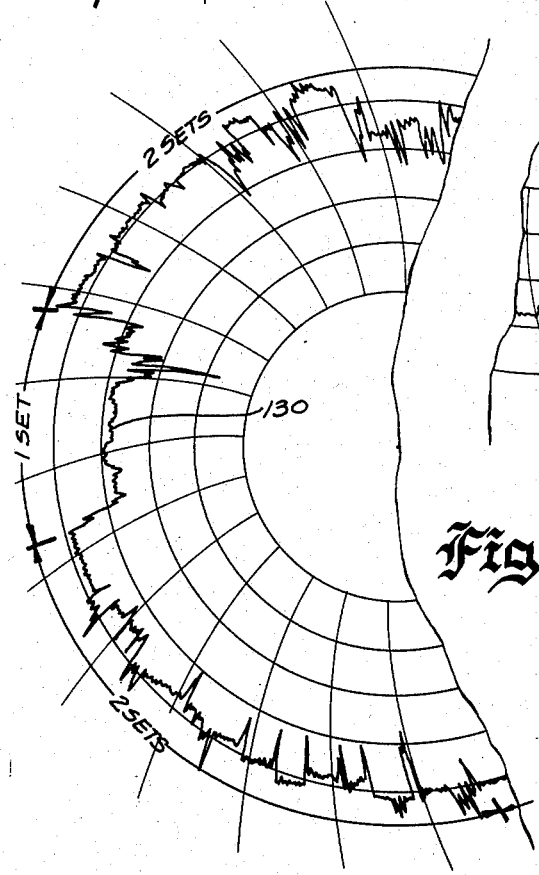
INVENTORS
CHARLES G. ROPER,
EDGAR GILCHRIST
and HARRY LOCKERY
BY
ATTORNEYS United States Patent Office 2,895,502
Patented July 21, 1959

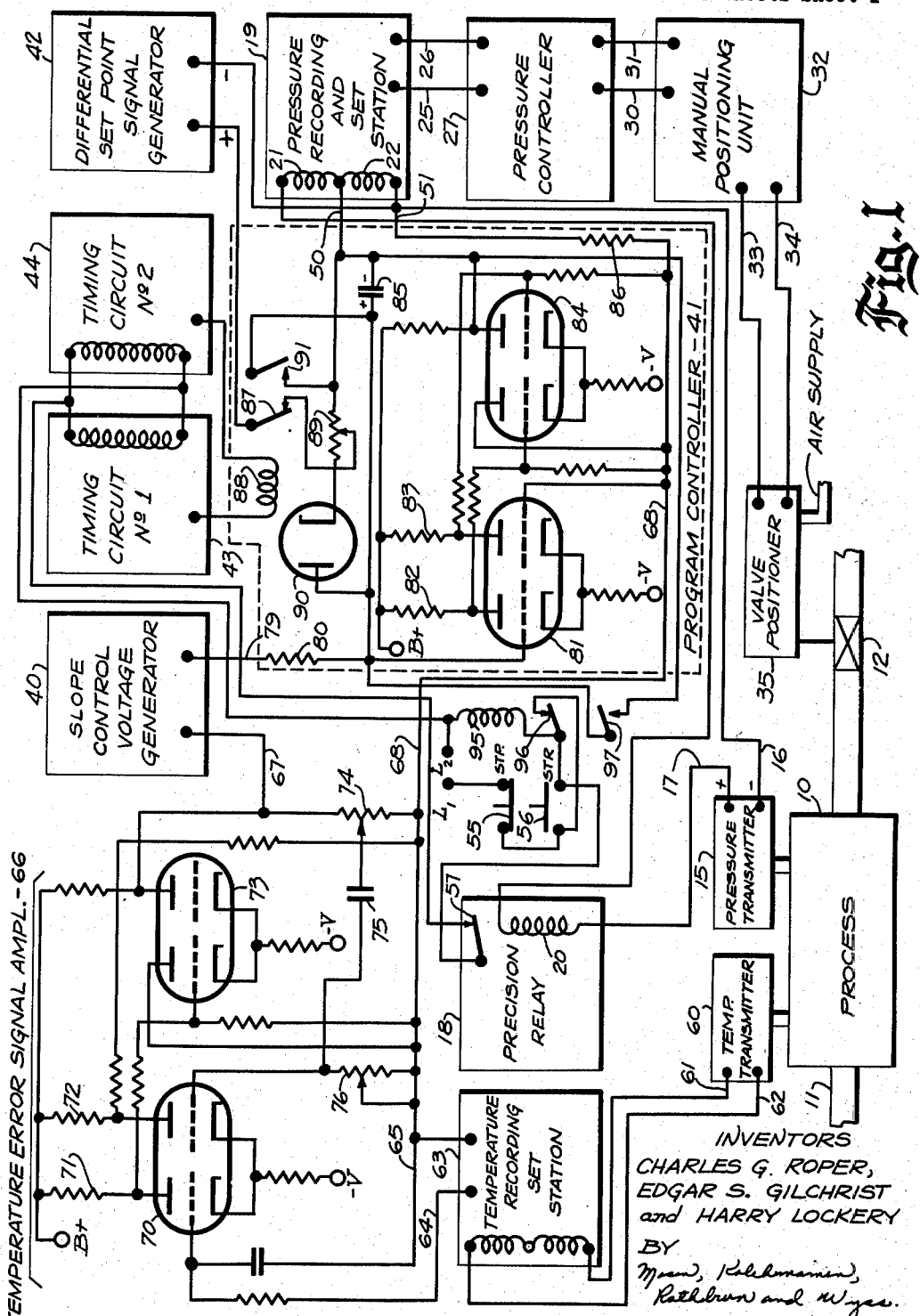

2,895,502

AUTOMATIC PROCESS CONTROL SYSTEM

Charles Garland Roper, Fairfield, Edgar Sheppard Gilchrist, Easton, and Harry Lockery, New Haven, Conn., assignors to Manning, Maxwell & Moore, Inc., Stratford, Conn., a corporation of New Jersey Application October 20, 1955, Serial No. 541,726

19 Claims. (Cl. 137—486)

The present invention relates to automatic process control systems, and, more particularly, to an automatic process control system wherein the pressure of the process is maintained within predetermined limits and is controlled in cascade with another variable of the process to produce the desired process control function. Specifically, the present invention relates to certain improvements in an automatic process control system of the type disclosed in a copending application of Charles G. Roper and Edgar S. Gilchrist, Serial No. 389,564, filed November 2, 1953, which is assigned to the same assignee as the present invention.

In certain process control applications, such as those involving controlled exothermic reactions, it is necessary to increase the process pressure at a predetermined rate and in accordance with a predetermined program cycle or schedule. In such applications, it is also necessary to provide temperature override facilities so that the rate of pressure increase may be decreased if the process temperature exceeds a predetermined control point. Furthermore, such program control applications require facilities for maintaining the process pressure within predetermined upper and lower limits during each program cycle, so that pressure variations may be limited by modifying the control function at said predetermined upper and lower control points.

In other process control applications, such as those involving flow control, it is sometimes necessary to modify the pressure control function so that the control system has relatively low sensitivity within a first relatively small pressure range and has relatively high sensitivity when the process pressure moves either above or below said first pressure range. For example, in surge tank control applications wherein the generator set loading on the tank varies abruptly throughout the day, it is desirable to control flow to the surge tank as smoothly as possible despite abrupt variations in loading on the tank so that accurate measurement of flow can be made and an accurate indication of total flow may be derived from the flow recorder chart. Such surge tank control applications also involve modifying the pressure control function at predetermined limits so that the system will be relatively insensitive to minor pressure variations while maintaining the surge tank pressure within predetermined overall limits.

It is therefore, an object of the present invention to provide a new and improved automatic process control system wherein the process pressure may be held within predetermined upper and lower limits.

It is another object of the present invention to provide a new and improved automatic process control system of the electronic type wherein the process pressure may be varied at a predetermined rate between predetermined upper and lower limits.

It is a further object of the present invention to provide a new and improved automatic process control system of the electronic type wherein the process pressure is increased at a predetermined rate to a predetermined upper pressure limit and is reset to a predetermined lower pressure limit, the rate of pressure increase being modified in accordance with variations in the temperature of the process.

It is a still further object of the present invention to provide a new and improved automatic process control system of the electronic type which is particularly suitable for controlling exothermic reactions.

It is another object of the present invention to provide a new and improved automatic process control system of the electronic type wherein the sensitivity of the control system is varied as the measured variable of the process exceeds predetermined upper and lower limits.

The invention, both as to its organization and method of operation, together with further objects and advantages thereof, will best be understood by reference to the following specification taken in connection with the accompanying drawings, in which:

Fig. 1 is an electrical circuit diagram, partly in block diagram form, of an automatic process control system embodying the principles of the present invention;

Fig. 2 is a timing diagram illustrating the manner in which process pressure is varied in the system of Fig. 1;

Fig. 4 is a characteristic curve illustrating the variations in sensitivity of the control system of Fig. 3;

Fig. 5 is a flow meter recording chart obtained by prior art arrangements; and

Fig. 6 is a flow meter recording chart obtained with the control system of Fig. 3.

Figure 3:
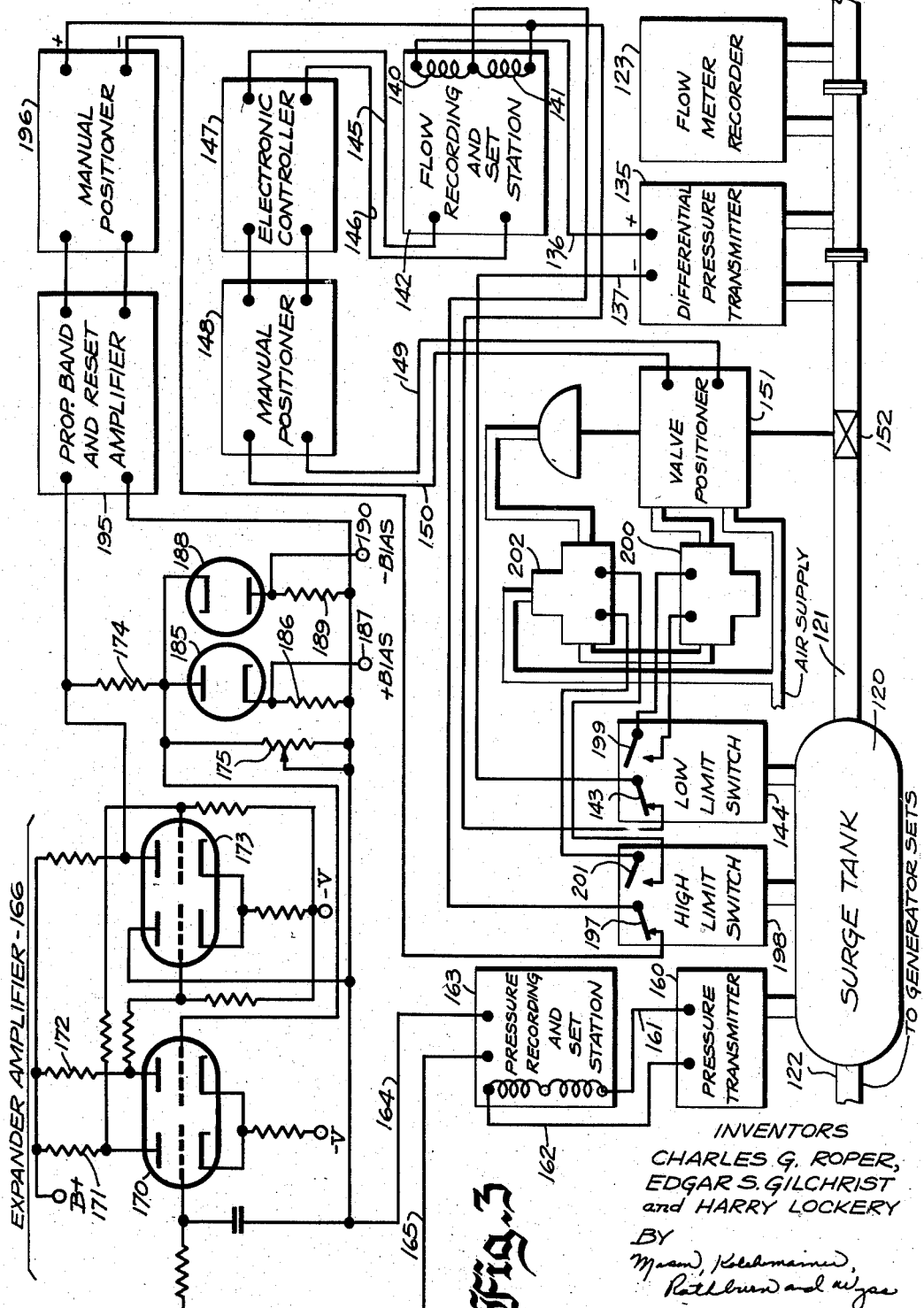
Fig. 3 is an electrical circuit diagram, partly in block diagram form, of an alternative process control system embodying the features of the present invention.

Referring now to the drawings, and more particularly to Figs. 1 and 2 thereof, the process control system of the present invention is therein illustrated as controlling the process 10, provided with the inlet line 11 and the process pressure being controlled by means of the valve 12 under the control of the process control system of the present invention. The control system of the present invention increases the pressure of the process 10 at a predetermined rate and in accordance with a predetermined program or timing cycle. Furthermore, the control system of the present invention provides temperature override facilities so that the rate of pressure rise during any one cycle is decreased in the event that the temperature of the process exceeds a predetermined control point. Accordingly, if the process 10 involves an exothermic reaction wherein tremendous heat is developed, if the pressure changes too fast, the control system of the present invention functions to reduce the rate of pressure rise so that a temperature override function is achieved.

Considering now the component units of the automatic process control system of Fig. 1, the process pressure is measured by means of a pressure transmitter 15 which converts pressure variations into a direct current signal proportional to the instantaneous pressure of the process 10. This direct current signal is transmitted over the conductors 16 and 17 to a precision relay 18 and a pressure recording and set station 19. In the precision relay 18 the direct current signal flows through the energizing coil 20 of the relay and in the unit 19 the direct current signal flows through the recording coil 21 and the set point coil 22, the set point portion of the unit 19 providing an error signal proportional to the deviation of the process pressure from the process control point set in the unit 19. This error signal is transmitted by way of the conductors 25 and 26 to the pressure controller 27 wherein the error signal is modified in accordance with desired process control functions, such as rate response, proportional band response and reset rate control, the controller 27 providing a direct current output signal which is transmitted by way of the conductors 30 and 31, the manual control station 32 and the conductors 33 and 34 to the valve positioner 35 wherein the output signal is converted into a proportional pneumatic signal which is employed to actuate the valve 12.

In considering the portion of the system of Fig. 1 just described, it is pointed out that the units 15, 19, 27, 32 and 35 may be substantially identical to the corresponding units shown and described in detail in the above-identified copending application, Serial No. 389,564 and reference may be had to this copending application for a detailed description of these component units. However, for the purposes of the present invention it may be generally stated that the recording and set station unit 19 is provided with a set point lever which may be adjusted so that the pressure of the process 10 is maintained at any predetermined point within the control range of the system. Thus, if the pressure of the process 10 increases so that the direct current signal developed on the conductors 16 and 17 exceeds the set point value, an error voltage is developed on the conductors 25 and 26 which is suitably modified in accordance with predetermined, proportional rate and reset functions in the controller 27 and is transmitted to the valve positioner 35 so as to control movement of the valve 12 to bring the process pressure back to the set point established in the unit 19.

In order to increase the process pressure at a predetermined rate and in accordance with the predetermined programming cycle, there is provided a slope control voltage generator 40, a program controller 41, a differential set point generator 42 and a pair of timing circuits 43 and 44. The slope control voltage generator 40 produces a constant but adjustable direct current voltage which is supplied to the program controller 41 and the controller 41 performs an integrating function on the voltage developed by the generator 40 and derives a gradually increasing direct current output signal the rate of rise of which depends in part upon the amplitude of the voltage developed by the generator 40. The direct current output signal developed by the program controller 41 is supplied over the conductors 50 and 51 to the set point coil 22 in the pressure recording and set station unit 19, this direct current signal flowing through the coil 22 in a direction opposite to that of the output signal developed by the pressure transmitter 15. The program controller 41 thus produces a variable electrical set point signal which increases at a rate determined by the setting of the voltage generator 40. On the other hand, the differential set point signal generator 42 develops a constant but adjustable direct current signal which is supplied to the set point coil 22 of the unit 19 in opposition to the variable set point signal developed by the program controller 41. The timing circuits 43 and 44 are energized from the power line terminals $L_1$ and $L_2$ under the control of the stop button 55, the start button 56 and the relay contacts 57 of the precision relay 18, the relay contacts 57 being closed only during periods when the pressure of the process 10 is below a predetermined minimum value, as will be described in more detail hereinafter.

In order to vary the rate of pressure increase in accordance with temperature variations of the process 10, there is provided a temperature transmitter 60 which develops a direct current electrical signal proportional to the temperature of the process 10, this electrical signal being supplied over the conductors 61 and 62 to a temperature recording and set station unit 63. The unit 63 develops an error voltage on the output conductors 64 and 65 thereof if the direct current signal from the transmitter 60 deviates from the temperature set point established in the unit 63 and this error voltage is supplied to a temperature error signal amplifier 66. In this connection it will be understood that the temperature transmitter 60 and recording and set station 63 may be substantially identical to the corresponding units shown and described in detail in the above-identified copending application so that a detailed description of these units is considered unnecessary herein.

In the temperature error signal amplifier 66, the error voltage developed between the conductors 64 and 65 by the unit 63 is coupled between the control grids of a first differential amplifier stage including the double triode tube 70. The voltages developed across the anode resistors 71 and 72 of the differential amplifier 70 are coupled to the respective control grids of a second differential amplifier stage including the double triode tube 73, the anode of the left hand section of the tube 73 being connected to the common conductor 65 and the anode of the right hand section of the tube 73 acting as the output stage for the amplifier 66. A potentiometer 74 connected across the output of the amplifier 66 is employed to feedback a signal through the condenser 75 to the control grid of the right hand section of the control grid 70, a potentiometer 76 being connected between the control grid of the right hand section of the tube 70 and the common conductor 76. Accordingly, adjustment of the potentiometer 74 provides a proportional band adjustment and variation of the potentiometer 76 provides a reset rate adjustment so that the error voltage developed between the conductors 67 and 68 may be modified in accordance with the desired process control functions.

The voltages developed by the amplifier 66 and the slope control generator 40 are connected in series and are coupled through the series resistor 80 to the control grid of the left hand section of a double triode amplifier tube 81, the control grid of the right hand section of the tube 81 being connected to the common conductor 68, so that a first differential amplifier stage is provided in the program controller 41. The output voltages developed across the anode resistors 82 and 83 of the tube 81 are coupled to the respective control grids of a second differential amplifier tube 84, the anode of the left hand section of the tube 84 being connected to the common conductor 68 and the anode of the right hand section of the tube 84 being directly connected to the output conductor 50 of the program controller 41. The anode of the right hand section of the tube 84 is also coupled through the condenser 85 to the control grid of the left hand section of the tube 81 so that the condenser 85 and the resistor 80 constitute a feedback network between the output and input of the controller 41 which causes the controller 41 to integrate the voltage impressed upon the input conductors 79 and 68. Accordingly, when an input voltage is applied between the conductors 68 and 79, the program controller 41 functions to develop a gradually increasing voltage across the output load resistor 86 so that a gradually increasing current flows over the conductors 50 and 51 and through the set point coil 22 of the unit 19, the slope of this gradually increasing current being determined by the magnitude of the input voltage applied to the conductors 68 and 79 and the size of the resistor 80.

The current output of the differential set point current generator 42 is connected through the contacts 87 of the relay 88, through the potentiometer 89 and over the conductor 50 to the set point coil 22 of the unit 19, this current flowing through the coil 22 in the same direction as the current developed by the transmitter 15 but in the opposite direction from the current developed by the program controller 41.

In order to limit the maximum current developed by the program controller 41 to the amplitude of the current developed by the differential set point current generator 42, the potentiometer 89 is chosen of the same value as the resistor 86 and a diode rectifier 90 is connected in series with the potentiometer 89 across the condenser 85. Accordingly, when the voltage across the condenser 85 becomes equal to the voltage developed across the potentiometer 89 the rectifier 90 conducts and prevents further charging of the condenser 85 with the result that the maximum current developed by the program controller 41 is limited to the current developed by the generator 42. When the relay 88 is energized, the contacts 87 thereof are opened and the contacts 91 thereof are closed so that the condenser 85 is short circuited with the result that the condenser 85 is substantially immediately discharged. With this current limiting arrangement, the system integrates back to the mechanical set point established in the unit 19 but goes no further.

Considering now the operation of the above-described control system in causing cyclic increase in pressure of the process 10 while providing an automatic temperature override function which modulates the pressure increase function, reference may be had to Fig. 2 wherein a typical program cycle of the system is shown. Thus, referring to this figure, the upper pressure limit in the process is shown as the pressure $P_1$ and the lower pressure limit of the process is shown as the pressure $P_2$. Assuming that the process is at the temperature set point established by the unit 63 so that no error voltage is developed between the conductors 67 and 68 and assuming, further, that the start button 56 is closed and the pressure process 10 is at the minimum value $P_2$, the precision relay 18 is so adjusted that with a minimum current proportional to the pressure $P_2$ flowing through the coil 20 the relay contacts 57 are closed so that the timing circuits 43 and 44 are energized and start their respective cycles. The program controller 41 receives a constant voltage signal developed by the generator 40 and integrates this voltage in the manner described above so as to produce a gradually increasing current through the set point coil 22 of the unit 19. The combined currents developed by the units 41 and 42 thus provide an electrical pressure set point signal which gradually increases during the timing interval of the timing circuit 43 so that the pressure of the process follows this set point signal as indicated by the gradually increasing portion 95 of the pressure response curve shown in Fig. 2. At the end of the timing interval of the timing circuit 43, i.e., the time interval $T_1$ in Fig. 2, the relay 88 in the program control 41 is energized with the result that the contacts 87 thereof are opened and the contacts 91 thereof are closed. When the contacts 87 are opened, the differential set point signal developed by the unit 42 is removed from the set point coil 22 and when the contacts 91 are closed, the condenser 85 is short circuited so that the current developed by the program controller 41 is reduced to zero. Accordingly, the pressure of the process 10 rises quickly to the value $P_1$ which is established by the mechanical setting of the set point lever in the unit 19.

At the end of the timing interval of the timing circuit 44, i.e., at the end of the timing interval $T_2$ in Fig. 2, the relay 88 is deenergized so that the contacts 87 thereof are closed and the contacts 91 thereof are opened. When this occurs the full differential set point signal developed by the unit 42 is impressed upon the set point coil 22 of the unit 19 with the result that this differential set point signal overrides the mechanical set point signal of the unit 19 and forces the pressure of the process down to the value $P_2$. However, as soon as the process pressure reaches a value slightly above the pressure $P_2$, the precision relay contacts 57 close so that the timing circuits 43 and 44 are reset and are started again so that the above-described cycle is repeated. In this connection, it will be understood that the time interval $T_3$ in Fig. 2 is dependent upon the process itself and the rapidity with which the process responds to the differential electrical set point signal developed by the unit 42.

In the above description of the operation of the system of Fig. 1, it has been assumed that the temperature of the process remains at the set point established by the unit 63. However, if the temperature of the process rises above the set point, an error voltage is developed between the conductors 67 and 68 which subtracts from the voltage developed by the slope control voltage generator 40. Accordingly, the input voltage to the program controller 41 is decreased so that the slope of the pressure increase 95 (Fig. 2) is reduced. On the other hand, if the process temperature falls below the set point established by the unit 63, a positive voltage is developed between the conductors 67 and 68 which is added to the voltage developed by the generator 40 so that the slope of the pressure increase curve 95 is increased. However, if the pressure of the process reaches the maximum value $P_1$ before the end of the interval $T_1$, as indicated by the dotted line 96 in Fig. 2, the rectifier 90 is rendered conductive as soon as the maximum pressure value $P_1$ is reached so that the current developed by the program controller 41 does not increase positively beyond the value required to establish the maximum pressure $P_1$. Accordingly, the pressure response curve remains constant thereafter until the end of the interval $T_2$ at which time the timing circuit 44 completes its cycle and the process pressure is returned to the minimum value $P_2$ in the manner described in detail above. It will also be noted that if the pressure of the process is increased at a relatively slower rate, as indicated by the dotted line 97 in Fig. 2, so that the process pressure does not reach the value $P_1$ at the end of the interval $T_1$, the overriding differential set point signal developed by the unit 42 is removed at the end of the interval $T_1$ so that the pressure of the process is rapidly increased to the maximum value $P_1$ as indicated at 98 in Fig. 2. Accordingly, by the end of the interval $T_2$ the process pressure is always raised to the maximum $P_1$ irrespective of the slope of the pressure response curve during the interval $T_1$.

In order to place the control system in operation, there is provided a start relay 95 which is energized by depressing the start button 56 and is provided with the holding contacts 96 which hold the relay 95 energized during periods when the control system is operating. The relay 95 is also provided with a second pair of contacts 97 which are connected across the condenser 85 and are opened during periods when the relay 95 is energized. Accordingly, as soon as the start button 56 is depressed, the contacts 97 are opened thus permitting the program controller 41 to produce the above-described gradually increasing set point signal which is supplied to the set point coil 22 of the unit 19. If an electrical power supply failure occurs, the relay 95 is deenergized and the current supplied to the valve positioner 35 is reduced to zero so that the valve 12 remains fully open and the process pressure drops to zero. When electrical power is again supplied to the control system, if no adjustment has been made in the control system the process pressure will immediately rise to $P_2$ and remain there. This is because the contacts 97 of the relay 95 remain closed during periods when the relay 95 is deenergized so that the condenser 85 is short circuited and the program controller 41 is prevented from increasing the electrical set point of the unit 19. If it is then desired to start cyclic control of the process in the manner described above, the start button 56 is depressed so as to energize the relay 95.

In order to calibrate the control system initially, the stop button 55 is depressed so that power is removed from the timing circuits 43 and 44 and the relay 95 is deenergized. The pressure level $P_1$ is then set by moving the mechanical set point lever of the unit 19 to establish the desired maximum pressure limit of the process. The differential pressure $P_1-P_2$ in percent of full scale is then set on the differential set point current generator 42. In this connection it will be understood that the unit 42 may be substantially identical to the manual positioning unit 32 and the corresponding unit described in detail in the above identified copending application, the unit 42 being normally operated in the manual position wherein the current developed by the unit is calibrated in percent of full scale on the face of the instrument. The temperature control point is then set by movement of the mechanical set point lever in the unit 63 and the correct cycles, i.e., the timing intervals $T_1$ and $T_2$ are set in the timing circuits 43 and 44. For example, the timing circuit 43 may be set to have an interval of fifty-five seconds and the timing circuit 44 an interval of sixty seconds, thereby providing an interval of five seconds within which to adjust the process pressure to $P_1$ in the manner described in detail above at the end of the gradually increasing pressure cycle. The manual positioning unit 32 is then adjusted to bring the process pressure to $P_2$ and the unit 32 is then switched to automatic operation and the controller 27 is adjusted for optimum setting at the process pressure $P_2$. The precision relay 18 is preferably set at a point approximately 5% above the pressure $P_2$ and the slope control voltage generator 40 is adjusted to the required basic slope of the pressure responsive curve 95 in Fig. 2. After these adjustments have been made the start button 56 is depressed and the pressure of the process then begins to rise along the curve 95 in Fig. 2. If it is desired to stop the cyclic program control at any time this may be effected by depressing the stop button 55. When this is done the process pressure will immediately go to $P_2$ and remain at this pressure.

In Figs. 3, 4 and 6 there is illustrated an alternative embodiment of the present invention which is particularly suitable for flow control applications wherein a pressure controller is employed to set the control point of the flow control loop of the system. Thus, referring to Fig. 3, a flow control system for natural gas is shown wherein a surge tank 120 is employed to equalize flow from the inlet pipe 121 to a series of generator sets through the outlet pipe 122. Under normal operation, the number of generator sets in use varies throughout the day and due to the coal up periods involved in each generator set the demand on the surge tank 120 varies abruptly. The surge tank 120 must maintain sufficient flow to all of the generator sets so that they function properly. However, the pressure in the surge tank must not exceed a predetermined safe value. Conventionally, the pressure within the surge tank 120 should be maintained within a pressure of from 18 to 40 p.s.i. However, with abrupt variations in demand on the surge tank 120 and a conventional pneumatic control system the flow to the tank which is conventionally measured by a flow meter recorder 123, undergoes extreme variations and the recorder 123 has difficulty in following these variations and recording them accurately. Furthermore, the variations may be so great that the zero and full flow limit switches are actuated, the recorder is driven off scale and the system does not recover for an appreciable time interval thereafter. For example, in Fig. 5 there is shown a typical recording chart of a flow meter recorder obtained with process control systems of the prior art. It will be noted that in the curve of Fig. 5 a large number of fluctuations 125, 126 and 127 are produced when additional generator sets are added to the system. Since the chart of Fig. 5 must be integrated to obtain an accurate evaluation of the total flow during a particular twenty-four hour period, it will be evident that a record such as shown in Fig. 5 will not give accurate cost values for total flow due to the fact that it is impossible accurately to integrate the periods during the fluctuations 125, 126 and 127.

In the control system of 123 the flow to the surge tank 120 is controlled by a first flow control loop and a pressure controller is provided to modify the set point of the flow control system electrically so as to maintain the pressure within the tank 120 within the above described limits. However, in the pressure control loop, facilities are provided for modifying the gain of the pressure control loop so that within a first relatively small pressure range the gain of the pressure control loop is relatively low and if the pressure exceeds this first relatively small range the gain of the pressure control system is increased. With this arrangement the pressure within the surge tank 120 is permitted to vary within a relatively small pressure range without producing any substantial change in flow so that the fluctuations of the flow meter recorder 123 are substantially reduced and very few off-scale fluctuations are produced. For example, with the system of the present invention a recording chart such as shown in Fig. 6 may be obtained and it will be observed from Fig. 6 that the record 130 thereof has very few abrupt variations and practically no off-scale fluctuations when the number of generator sets is changed. Accordingly, integration of the record charge shown in Fig. 6 to obtain total flow is substantially more accurate and produces a total flow cost value which more nearly represents the actual use by the customer.

Considering now the component units of the control system of Fig. 3, the flow control loop includes a differential pressure transmitter 135, which develops an electrical signal on the conductors 136 and 137 which is proportional to the flow to the surge tank 120, this electrical signal being impressed upon both the recording coil 140 and the set point coil 141 of the flow recording and set station unit 142, the conductor 137 being connected through the normally closed switch contacts 143 of a low limit switch 144 for reasons to be described in more detail hereinafter. The set point portion of the unit 142 develops an error voltage which is transmitted by way of the conductors 145 and 146 to an electronic controller 147 wherein the error voltage may be modified in accordance with the desired process control functions such as proportional response, rate response and reset rate response. The output from the electronic controller 147 is transmitted through a manual positioning unit 148 and over the conductors 149 and 150 to a valve positioner 151 which controls movement of the valve 152 and hence flow to the surge tank 120 from the inlet pipe 121. The units 135, 142, 147, 148 and 151 may all be substantially identical to the corresponding units shown and described in detail in the above identified copending application and reference may be had to said copending application for a detailed description thereof. However, for the purposes of the present invention, it will be understood that variations in flow detected by the transmitter 135 are transmitted to the recording and set point unit 142 and an error voltage is developed on the conductors 145 and 146 proportional to the deviation of the measured variable from the set point established by the position of the mechanical set point lever within the unit 142. The valve positioned 151 then functions to adjust the position of the valve 152 to hold the flow at the set point determined by the unit 142.

In order to modify the flow control loop so that the pressure within the surge tank 120 is maintained within the pressure limits of 18 p.s.i. to 40 p.s.i., there is provided a pressure transmitter 160 which develops a direct current output signal on the conductors 161 and 162 which is proportional to the pressure in the tank 120, this direct current signal being impressed upon the input of a pressure recording and set station unit 163. The set point portion of the unit 163 develops an error voltage on the conductors 164 and 165 which is transmitted to an expander amplifier 166 wherein the error voltage is modified in accordance with a predetermined gain control characteristic so as to modify the sensitivity of the pressure control loop at predetermined upper and lower pressure limits. More particularly, the error voltage from the unit 163 is applied to the control grid of the left hand section of a double triode differential amplifier tube 170 and the differential output voltages produced across the anode resistors 171 and 172 of the two sections of the tube 170 are coupled to the respective control grids of a second double triode differential amplifier tube 173.

The anode of the left hand section of the tube 173 is connected to the common conductor 164 and the anode of the right hand section of the tube 173 is employed as an output circuit for the amplifier 166. A feedback circuit including the resistor 174 and the potentiometer 175 is employed to feedback a voltage from the output circuit to the control grid of the right hand section of the tube 170. Accordingly, by varying the potentiometer 175 a proportional response may be provided in the amplifier 166.

In order to provide a variable sensitivity for the pressure control loop of the system, the feedback network of the amplifier 166 is modified at predetermined control points corresponding to predetermined upper and lower pressure values. More particularly, as shown in Fig. 4, the gain characteristic of the expander amplifier 166 is adjusted so that when the error voltage developed between the conductors 164 and 165 varies above or below the pressure set point by an amount equal to the relatively small pressure range $P_1$ the gain of the amplifier 166 is relatively small as indicated by the slope of the gain characteristic 180. On the other hand, when the error signal increases above the pressure range $P_1$ the gain of the amplifier 166 is substantially increased as indicated by the characteristic 181. In the same manner when the pressure within the tank falls below the range $P_1$ the gain of the amplifier 166 is increased as indicated by the characteristic 182.

In order to provide the gain control characteristic shown in Fig. 4, a first biasing network including the diode rectifier 185 and the resistor 186 is connected between the junction point of the resistor 174 and the potentiometer 175 to the common conductor 164. The cathode of the rectifier 185 is biased positively by means of the bias source 187 so that the rectifier 185 is not normally conducting. However, when the error voltage developed at the output of the amplifier 166 becomes equal to the positive bias supplied to the cathode of the rectifier 185, this rectifier conducts and connects the resistor 186 in shunt with the potentiometer 175. When this occurs the feedback ratio is substantially reduced with the result that the gain of the amplifier 166 is substantially increased so as to provide a sensitivity corresponding to the characteristic 181 in Fig. 4.

In order to increase the gain of the amplifier 166 for a negative error signal, there is provided a rectifier 188 which is connected in series with the resistor 189 between the resistor 174 and the common conductor 164, the anode of the rectifier 188 being biased negatively by means of the bias source 190. When a negative error signal is developed at the output of the amplifier 166 which is equal to the bias voltage impressed upon the anode of the rectifier 188, this rectifier conducts and connects the resistor 189 in shunt with the potentiometer 175, thereby again reducing the amount of feedback in the amplifier 166 so that the gain of this amplifier is increased in accordance with the characteristic 182 in Fig. 4.

The output of the amplifier 166 is connected to a proportional and reset amplifier 195 wherein the error voltage developed at the output of the amplifier 166 may be suitably modified in accordance with the desired proportional and reset functions. The output of the amplifier 195 is connected by way of the manual positioner 196 to the set point coil 141 of the flow control unit 142 in opposition to the current flowing through the coil 141 from the differential pressure transmitter 135. Accordingly, the output from the pressure control loop acts as an electrical set point signal which modifies the flow set point established by the mechanical set point lever of the unit 142 in accordance with pressure variations in the surge tank 120. The output of the manual positioner 196 is connected in series with the normally closed contacts 197 of a high limit switch 198. The high and low limit switches are set to operate at the maximum and minimum pressure limits of the tank 120 and the pressure set point is adjusted in the unit 163 to approximately the mid-pressure value so that normally the switches 198 and 144 are not actuated. However, in the event of a failure in the electronic control equipment either the high limit switch 198 or the low limit switch 144 is actuated when the pressure within the tank 120 exceeds the corresponding pressure limit. If the low limit switch 144 is actuated the contacts 143 thereof are opened so as to remove the differential pressure signal from the input of the flow recording and set station unit 142. At the same time the contacts 199 of the switch 144 are closed so as to actuate the solenoid valve 200 which, in turn, actuates the valve 152 to maintain the desired flow. On the other hand, if the high limit switch 198 is actuated the contacts 197 thereof are opened so as to remove the pressure control signal from the input of the flow set station unit 142, the contacts 201 of the switch 198 being simultaneously closed so as to actuate the solenoid valve 202 and close the main valve 152. The pressure control loop is thus broken when the valve 152 is closed since the reset action in the amplifier 195 would call for more flow and when control of the valve 152 is shifted back to the electronic control system the valve 152 would slam full open.

While there have been described what are at present considered to be the preferred embodiments of the invention, it will be understood that various modifications may be made therein which are within the true spirit and scope of the invention as defined in the appended claims.

What is claimed as new and is desired to be secured by Letters Patent of the United States is:

1. In an automatic process control system, means for developing a first electrical signal proportional to the process pressure, means for developing an electrical error signal proportional to the deviation of said signal from a predetermined set point, means responsive to said error signal for controlling the process to reduce said error signal to zero, means for developing a differential set point signal, means for impressing said differential set point signal on said error signal developing means in the same polarity as said first electrical signal, thereby to cause a reduction in the process pressure, means for developing a gradually increasing electrical set point signal, means for impressing said electrical set point signal on said error signal developing means in the correct polarity to offset said differential set point signal, thereby to cause a gradual increase in the process pressure, and means for removing said differential set point signal from said error signal developing means.

2. In an automatic process control system, means for developing a first electrical signal proportional to the process pressure, means for developing an electrical error signal proportional to the deviation of said signal from a predetermined set point, means responsive to said error signal for controlling the process to reduce said error signal to zero, means for developing a differential set point signal, means for impressing said differential set point signal on said error signal development means in the same polarity as said first electrical signal, thereby to cause a reduction in the process pressure, means for developing a gradually increasing electrical set point signal, means for impressing said electrical set point signal on said error signal developing means in the correct polarity to offset said differential set point signal, thereby to cause a gradual increase in the process pressure, means for preventing the amplitude of said electrical set point from exceeding the amplitude of said differential set point signal so that the process pressure does not exceed said predetermined set point, and means for removing said differential set point signal from said error signal developing means.

3. In an automatic process control system, means for developing a first electrical signal proportional to the process pressure, means for developing an electrical error signal proportional to the deviation of said signal from a predetermined set point, means responsive to said error signal for controlling the process to reduce said error signal to zero, means for developing a differential set point signal, means for impressing said differential set point signal on said error signal developing means in the same polarity as said first electrical signal, thereby to cause a reduction in the process pressure, means for developing a gradually increasing electrical set point signal, means for impressing said electrical set point signal on said error signal developing means in the correct polarity to offset said differential set point signal, thereby to cause a gradual increase in the process pressure, and means for removing both said differential set point signal and said gradually increasing electrical set point signal from said error signal developing means, thereby to cause the process pressure to return to said predetermined set point.

4. In an automatic process control system, means for developing a first electrical signal proportional to the process pressure, means for developing an electrical error signal proportional to the deviation of said signal from a predetermined set point, means responsive to said error signal for controlling the process to reduce said error signal to zero, means for developing a differential set point signal, means for impressing said differential set point signal on said error signal developing means in the same polarity as said first electrical signal, thereby to cause a reduction in the process pressure, relay means conected in series with said pressure signal developing means, means for developing a gradually increasing electrical set point signal, means for impressing said electrical set point signal on said error signal developing means in the correct polarity to offset said differential set point signal, thereby to cause a gradual increase in the process pressure, and timing means initially controlled by said relay means for removing said differential set point signal from said error signal developing means, thereby to cause the process pressure to return to said predetermined set point.

5. In an automatic process control system, means for developing a first electrical signal proportional to the process pressure, means for developing an electrical error signal proportional to the deviation of said first signal from a predetermined set point, means responsive to said error signal for controlling the process to reduce said error signal to zero, means for developing a differential set point signal, means for developing a gradually increasing electrical set point signal, relay means including a coil energized in accordance with said first electrical signal, first timing means controlled by said relay means for impressing said differential set point signal on said error signal developing means in the same polarity as said first electrical signal and for impressing said electrical set point signal on said error signal developing means in the opposite polarity from said first electrical signal, thereby to cause the process pressure to increase in accordance with the slope of said electrical set point signal, means controlled by said first timing means for removing said differential set point signal from said error signal developing means, thereby to cause the process pressure to rise to said predetermined set point, and second timing means controlled by said relay means for reapplying said differential set point signal to said error signal developing means, thereby to cause the process pressure to decrease rapidly in accordance with said differential set point signal.

6. In an automatic process control system, means for developing a first electrical signal proportional to the process pressure, means for developing an electrical error signal proportional to the deviation of said first signal from a predetermined set point, means responsive to said error signal for controlling the process to reduce said error signal to zero, means for developing a differential set point signal, means for developing a gradually increasing electrical set point signal, relay means including a coil energized in accordance with said first electrical signal, first timing means controlled by said relay means for impressing said differential set point signal on said error signal developing means in the same polarity as said first electrical signal and for impressing said electrical set point signal on said error signal developing means in the opposite polarity from said first electrical signal, thereby to cause the process pressure to increase in accordance with the slope of said electrical set point signal, means controlled by said first timing means for removing said differential set point signal from said error signal developing means and for reducing said electrical set point signal to zero, thereby to cause the process pressure to rise to said predetermined set point, second timing means for reapplying said differential set point signal and said reduced electrical set point signal to said error signal developing means, thereby to cause the process pressure to decrease rapidly, and means controlled by said relay means for resetting said first and second timing means when the process pressure reaches a predetermined minimum value.

7. In an automatic process control system, means for developing a first electrical signal proportional to the process pressure, means for developing an electrical error signal proportional to the deviation of said first signal from a predetermined set point, means responsive to said error signal for controlling the process to reduce said error signal to zero, means for developing a differential set point signal, a differential amplifier, means for impressing a slope control voltage on the input to said amplifier, means including a condenser connected between the input and output of said amplifier for developing a gradually increasing electrical set point signal at the output of said amplifier, relay means including a coil energized in accordance with said first electrical signal, first timing means controlled by said relay means for impressing said differential set point signal on said error signal developing means in the same polarity as said first electrical signal and for impressing said electrical set point signal on said error signal developing means in the opposite polarity from said first electrical signal, thereby to cause the process pressure to increase in accordance with the slope of said electrical set point signal, means controlled by said first timing means for removing said differential set point signal from said error signal developing means and short circuiting said condenser to reduce said electrical set point signal to zero, thereby to cause the process pressure to rise to said predetermined set point, and second timing means controlled by said relay means for reapplying said differential set point signal to said error signal developing means while removing the short circuit from said condenser, thereby to cause the process pressure to decrease rapidly in accordance with said differential set point signal.

8. In an automatic process control system, means for developing a first electrical signal proportional to the process pressure, means for developing an electrical error signal proportional to the deviation of said first signal from a predetermined set point, means responsive to said error signal for controlling the process to reduce said error signal to zero, means for developing a differential set point signal, a differential amplifier, means for impressing a slope control voltage on the input to said amplifier, means including a condenser connected between the input and output of said amplifier for developing a gradualy increasing electrical set point signal at the output of said amplifier, means for varying said slope control voltage in accordance with deviations of the temperature of the process from a predetermined temperature set point so that the slope of said gradually increasing electrical set point signal varies inversely with said temperature deviations, relay means including a coil energized in accordance with said first electrical signal, first timing means controlled by said relay means for impressing said differential set point signal on said error signal developing means in the same polarity as said first electrical signal and for impressing said electrical set point signal on said error signal developing means in the opposite polarity from said first electrical signal, thereby to cause the process pressure to increase in accordance with the slope of said electrical set point signal, means controlled by said first timing means for removing said differential set point signal from said error signal developing means and short circuiting said condenser to reduce said electrical set point signal to zero, thereby to cause the process pressure to rise to said predetermined set point, and second timing means controlled by said relay means for reapplying said differential set point signal to said error signal developing means while removing the short circuit from said condenser, thereby to cause the process pressure to decrease rapidly in accordance with said differential set point signal.

9. In an automatic process control system, means for developing a first electrical signal proportional to the process pressure, means for developing an electrical error signal proportional to the deviation of said first signal from a predetermined set point, means responsive to said error signal for controlling the process to reduce said error signal to zero, means for developing a differential set point signal, a differential amplifier, means for impressing a slope control voltage on the input to said amplifier, means including a condenser connected between the input and output of said amplifier for developing a gradually increasing electrical set point signal at the output of said amplifier, means for developing an error voltage proportional to deviation of the temperature of the process from a predetermined set point, means for supplying said error voltage to the input of said differential amplifier in series with said slope control voltage so that the slope of said gradually increasing electrical set point signal increases as the temperature of the process falls below said temperature set point, relay means including a coil energized in accordance with said first electrical signal, first timing means controlled by said relay means for impressing said differential set point signal on said error signal developing means in the same polarity as said first electrical signal and for impressing said electrical set point signal on said error signal developing means in the opposite polarity from said first electrical signal, thereby to cause the process pressure to increase in accordance with the slope of said electrical set point signal, means controlled by said first timing means for removing said differential set point signal from said error signal developing means and short circuiting said condenser to reduce said electrical set point signal to zero, thereby to cause the process pressure to rise to said predetermined set point, and second timing means controlled by said relay means for reapplying said differential set point signal to said error signal developing means while removing the short circuit from said condenser, thereby to cause the process pressure to decrease rapidly in accordance with said differential set point signal.

10. In an automatic process control system, means for developing a first electrical signal proportional to the process pressure, means for developing an electrical error signal proportional to the deviation of said first signal from a predetermined set point, means responsive to said error signal for controlling the process to reduce said error signal to zero, means for developing a differential set point signal, a differential amplifier, means for impressing a slope control voltage on the input to said amplifier, means including a condenser connected between the input and output of said amplifier for developing a gradually increasing electrical set point signal at the output of said amplifier, means for developing an error voltage proportional to deviation of the temperature of the process from a predetermined set point, means for supplying said error voltage to the input of said differential amplifier in series with said slope control voltage so that the slope of said gradually increasing electrical set point signal increases as the temperature of the process falls below said temperature set point, means for modifying said error voltage in accordance with a desired process control function, relay means including a coil energized in accordance with said first electrical signal, first timing means controlled by said relay means for impressing said differential set point signal on said error signal developing means in the same polarity as said first electrical signal and for impressing said electrical set point signal on said error signal developing means in the opposite polarity from said first electrical signal, thereby to cause the process pressure to increase in accordance with the slope of said electrical set point signal, means controlled by said first timing means for removing said differential set point signal from said error signal developing means and short circuiting said condenser to reduce said electrical set point signal to zero, thereby to cause the process pressure to rise to said predetermined set point, and second timing means controlled by said relay means for reapplying said differential set point signal to said error signal developing means while removing the short circuit from said condenser, thereby to cause the process pressure to decrease rapidly in accordance with said differential set point signal.

11. In an automatic process control system, means for developing a first electrical signal proportional to the process pressure, means for developing an electrical error signal proportional to the deviation of said first signal from a predetermined set point, means responsive to said error signal for controlling the process to reduce said error signal to zero, means for developing a differential set point signal, a differential amplifier, means for impressing a slope control voltage on the input to said amplifier, means including a condenser connected between the input and output of said amplifier for developing a gradually increasing electrical set point signal at the output of said amplifier, means for developing an error voltage proportional to deviation of the temperature of the process from a predetermined set point, means for supplying said error voltage to the input of said differential amplifier in series with said slope control voltage so that the slope of said gradually increasing electrical set point signal increases as the temperature of the process falls below said temperature set point, means for modifying said error voltage to provide proportional band and reset rate action, relay means including a coil energized in accordance with said first electrical signal, first timing means controlled by said relay means for impressing said differential set point signal on said error signal developing means in the same polarity as said first electrical signal and for impressing said electrical set point signal on said error signal developing means in the opposite polarity from said first electrical signal, thereby to cause the process pressure to increase in accordance with the slope of said electrical set point signal, means controlled by said first timing means for removing said differential set point signal from said error signal developing means and short circuiting said condenser to reduce said electrical set point signal to zero, thereby to cause the process pressure to rise to said predetermined set point, and second timing means controlled by said relay means for reapplying said differential set point signal to said error signal developing means while removing the short circuit from said condenser, thereby to cause the process pressure to decrease rapidly in accordance with said differential set point signal.

12. In an automatic process control system, means for developing a first electrical signal proportional to the process pressure, means for developing an electrical error signal proportional to the deviation of said first signal from a predetermined set point, means responsive to said error signal for controlling the process to reduce said error signal to zero, means for developing a differential set point signal, a differential amplifier, means for impressing a slope control voltage on the input to said amplifier, means including a condenser connected between the input and output of said amplifier for developing a gradually increasing electrical set point signal at the output of said amplifier, the output of said amplifier including a first impedance, a rectifier and a second impedance connected in series across said condenser, means for supplying said differential set point signal to said second impedance, said first and second impedances having equal values so that said rectifier conducts and prevents further charging of said condenser when said electrical set point signal becomes equal to said differential set point signal, relay means including a coil energized in accordance with said first electrical signal, first timing means controlled by said relay means for impressing said differential set point signal on said error signal developing means in the same polarity as said first electrical signal and for impressing said electrical set point signal on said error signal developing means in the opposite polarity from said first electrical signal, thereby to cause the process pressure to increase in accordance with the slope of said electrical set point signal, means controlled by said first timing means for removing said differential set point signal from said error signal developing means and short circuiting said condenser to reduce said electrical set point signal to zero, thereby to cause the process pressure to rise to said predetermined set point, and second timing means controlled by said relay means for reapplying said differential set point signal to said error signal developing means while removing the short circuit from said condenser, thereby to cause the process pressure to decrease rapidly in accordance with said differential set point signal.

13. In an automatic process control system, means for developing a first electrical signal proportional to a first variable of the process, means for developing a first error signal proportional to the deviation of said first electrical signal from a first predetermined set point, means responsive to said first error signal for controlling the process to reduce said first error signal to zero, means for developing a second electrical signal proportional to a second variable of the process, means for developing a second error signal proportional to the deviation of said second electrical signal from a second predetermined set point, means for modifying said second error signal when said second process variable deviates more than a predetermined amount from said second set point, and means for impressing said modified second error signal on said first error signal developing means to modify said first set point in accordance with variations in said modified second error signal.

14. In an automatic process control system, means for developing a first electrical signal proportional to a first variable of the process, means for developing a first error signal proportional to the deviation of said first electrical signal from a first predetermined set point, means responsive to said first error signal for controlling the process to reduce said first error signal to zero, means for developing a second electrical signal proportional to a second variable of the process, means for developing a second error signal proportional to the deviation of said second electrical signal from a second predetermined set point, a differential amplifier, means for impressing said second error signal on the input of said differential amplifier, means including a voltage divider network for feeding back a voltage from the output to the input of said amplifier to control the gain thereof, and means for varying said voltage divider network in the direction to increase the gain of said amplifier when said second error voltage exceeds predetermined upper and lower limits, and means for connecting the output of said amplifier to said first error signal developing means to modify said first set point.

15. In an automatic process control system, means for developing a first electrical signal proportional to a first variable of the process, means for developing a first error signal proportional to the deviation of said first electrical signal from a first predetermined set point, means responsive to said first error signal for controlling the process to reduce said first error signal to zero, means for developing a second electrical signal proportional to a second variable of the process, means for developing a second error signal proportional to the deviation of said second electrical signal from a second predetermined set point, a differential amplifier, means for impressing said second error signal on the input of said differential amplifier, means including a voltage divider network for feeding back a voltage from the output to the input of said amplifier to control the gain thereof, a first rectifier and first impedance connected in series across a portion of said voltage divider, a second rectifier and second impedance connected in series across a portion of said voltage divider, means normally biasing said first and second rectifiers against conduction, said first rectifier conducting when said second error signal exceeds said second set point by a predetermined amount in one direction and said second rectifier conducting when said second error signal exceeds said second set point by a predetermined amount in the other direction so as to increase the gain of said amplifier when either of said rectifiers is rendered conductive, and means for connecting the output of said amplifier to said first error signal developing means to modify said first set point.

16. In an automatic process control system, means for developing a first electrical signal proportional to process flow, means for developing a first error signal proportional to the deviation of said first signal from a first predetermined set point, means responsive to said first error signal for controlling the flow to reduce said first signal to zero, means for developing a second electrical signal proportional to process pressure, means for developing a second error signal proportional to the deviation of said second electrical signal from a second predetermined set point, means for impressing said second error signal on said first error signal developing means to modify said first set point, said second error signal having a relatively small value when the process pressure remains within a predetermined range of said second set point, and means for increasing the value of said second error signal when the process pressure exceeds said predetermined range so that small pressure variations do not affect said flow controlling means while correction is provided for pressure variations outside said range.

17. A surge tank control system, comprising means for developing a first electrical signal proportional to flow to the surge tank, means for developing a first error signal proportional to the deviation of said first signal from a first predetermined set point, means responsive to said first error signal for controlling the flow to reduce said first error signal to zero, means for developing a second electrical signal proportional to pressure within the tank, means for developing a second error signal proportional to the deviation of said second electrical signal from a second predetermined set point, means for impressing said second error signal on said first error signal developing means to modify said first set point, said second error signal having a relatively small value when the pressure within the tank remains within a predetermined range of said second set point, and means for increasing the value of said second error signal when the pressure within the tank exceeds said predetermined range so that small pressure variations do not affect said flow controlling means while larger pressure variations are corrected to maintain pressure within the tank within predetermined upper and lower limits.

18. A surge tank control system, comprising means for developing a first electrical signal proportional to flow to the surge tank, means for developing a first error signal proportional to the deviation of said first signal from a first predetermined set point, means responsive to said first error signal for controlling the flow to reduce said first error signal to zero, means for developing a second electrical signal proportional to pressure within the tank, means for developing a second error signal proportional to the deviation of said second electrical signal from a second predetermined set point, means for impressing said second error signal on said first error signal developing means to modify said first set point, said second error signal having a relatively small value when the pressure within the tank remains within a predetermined range of said second set point, means for increasing the value of said second error signal when the pressure within the tank exceeds said predetermined range so that small pressure variations do not affect said flow controlling means while correcting for larger pressure variations within the tank, and low pressure limit switch means for removing said first electrical signal from the input of said first error signal developing means when the pressure within the tank exceeds a predetermined lower limit.

19. A surge tank control system, comprising means for developing a first electrical signal proportional to flow to the surge tank, means for developing a first error signal proportional to the deviation of said first signal from a first predetermined set point, means responsive to said first error signal for controlling the flow to reduce said first error signal to zero, means for developing a second electrical signal proportional to pressure within the tank, means for developing a second error signal proportional to the deviation of said second electrical signal from a second predetermined set point, means for impressing said second error signal on said first error signal developing means to modify said first set point, said second error signal having a relatively small value when the pressure within the tank remains within a predetermined range of said second set point, means for increasing the value of said second error signal when the pressure within the tank exceeds said predetermined range so that small pressure variations do not affect said flow controlling means while correcting for larger vairations in pressure within the tank, and high pressure limit switch means for removing said second error signal from the input of said first error signal developing means when the pressure within the tank exceeds a predetermined upper limit.

References Cited in the file of this patent
UNITED STATES PATENTS

| | | |
|---|---|---|
| 1,877,810 | Chamberlain | Sept. 20, 1932 |
| 2,250,946 | Brown | July 29, 1941 |